Oct. 6, 1942.  A. WARMISHAM  2,298,090
OPTICAL OBJECTIVES
Filed Aug. 1, 1940

INVENTOR
A. WARMISHAM

Patented Oct. 6, 1942

2,298,090

UNITED STATES PATENT OFFICE 2,298,090

OPTICAL OBJECTIVE

Arthur Warmisham, Leicester, England, assignor to Taylor, Taylor & Hobson Limited, Leicester, England, a company of Great Britain Application August 1, 1940, Serial No. 349,143
In Great Britain August 2, 1939

14 Claims. (Cl. 88—57)

This invention relates to an anastigmatically corrected objective for photographic or projection or like purposes, of the kind comprising three axially aligned components, each consisting of a simple element, the middle component being dispersive and the two outer components collective.

Attempts to design an objective of this kind with a high aperture, say F/2.5, have hitherto resulted in an objective having rather heavy residual zonal spherical aberration, thereby restricting their use to short focal lengths of 1½ inches or less.

The present invention has for its object to provide an objective of this kind in which the same high aperture can be obtained with considerably improved zonal spherical aberration correction, or alternatively in which a still higher aperture can be obtained with the same degree of residual zonal spherical aberration.

In the objective according to the invention one of the collective components is made of a glass having a mean refractive index higher than 1.75 and preferably higher than 1.8, at least one of the other two components being made of glass having a mean refractive index less than 1.7. Various examples of glass having refractive index higher than 1.75 are given in British Patent Specification No. 462,304, such glass having as its main constituents oxides of elements such as tungsten, tantalum, lanthanum, thorium, yttrium, zirconium, hafnium and columbium.

The sum of the numerical values of the radii of curvature of the front surface of the front component and the rear surface of the rear component lies between .85 and 1.3 times the equivalent focal length of the objective.

It is to be understood that the term "front" as herein used refers to the side of the objective nearer to the longer conjugate and the term "rear" to that nearer the shorter conjugate.

When the rear component has the high index, the axial air separation between the middle and rear components is preferably less than forty per cent of that between the front and middle components. When the front component has the high index, the axial air separation between the front and middle components is preferably less than fifty per cent of that between the middle and rear components. In either case the axial air separation between the high index component and the middle component is preferably less than one tenth and greater than one-fiftieth of the equivalent focal length of the objective.

Figure 1:
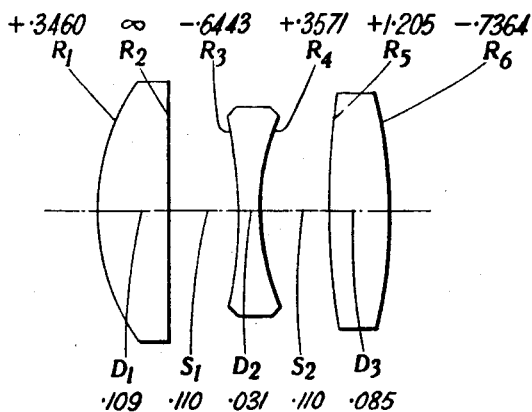
Figure 2:
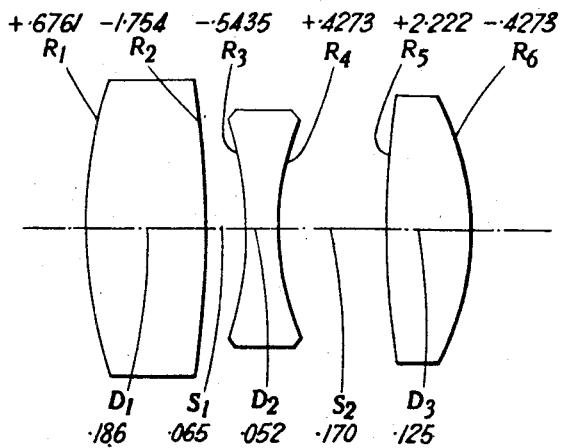
Figure 3:
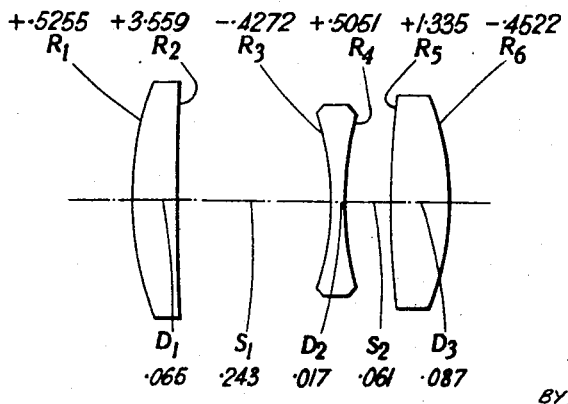

In the accompanying drawing, Figures 1, 2 and 3 respectively show diagrammatically three convenient practical examples of objective according to the invention. Numerical data for these three examples are given in the following tables, in which the radii of curvature of the individual surfaces are designated by $R_1R_2...$ counting from the front, the positive sign indicating that the surface is convex towards the front and the negative sign that it is concave thereto, whilst the thicknesses of the individual elements along the axis are designated by $D_1D_2D_3$ and the axial air spaces between the components by $S_1S_2$. The tables also give the mean refractive indices and the Abbe $\nu$ numbers of the glasses used for the individual elements.

*Example I*

[Equivalent focal length 1.000. Relative aperture F/2.5]

| Radius | Thickness or separation | Refractive index $n_D$ | Abbe $\nu$ number |
|---|---|---|---|
| $R_1 = +.3460$ | $D_1 = .109$ | 1.574 | 57.5 |
| $R_2 = \infty$ | $S_1 = .110$ | | |
| $R_3 = -.6443$ | $D_2 = .031$ | 1.697 | 30.7 |
| $R_4 = +.3571$ | $S_2 = .110$ | | |
| $R_5 = +1.205$ | $D_3 = .085$ | 1.901 | 42.5 |
| $R_6 = -.7364$ | | | |

*Example II*

[Equivalent focal length 1.000. Relative aperture F/2.2]

| Radius | Thickness or separation | Refractive index $n_D$ | Abbe $\nu$ number |
|---|---|---|---|
| $R_1 = +.6761$ | $D_1 = .186$ | 1.901 | 42.5 |
| $R_2 = -1.754$ | $S_1 = .065$ | | |
| $R_3 = -.5435$ | $D_2 = .052$ | 1.697 | 30.7 |
| $R_4 = +.4273$ | $S_2 = .170$ | | |
| $R_5 = +2.222$ | $D_3 = .125$ | 1.613 | 59.3 |
| $R_6 = -.4273$ | | | |

*Example III*

[Equivalent focal length 1.000. Relative aperture F/2.7]

| Radius | Thickness or separation | Refractive index $n_D$ | Abbe $\nu$ number |
|---|---|---|---|
| $R_1 = +.5255$ | $D_1 = .065$ | 1.613 | 59.3 |
| $R_2 = +3.559$ | $S_1 = .243$ | | |
| $R_3 = -.4272$ | $D_2 = .017$ | 1.697 | 30.7 |
| $R_4 = +.5051$ | $S_2 = .061$ | | |
| $R_5 = +1.335$ | $D_3 = .067$ | 1.901 | 42.5 |
| $R_6 = -.4522$ | | | |

As will be seen, the first and third examples employ the high index glass in the rear component, and both give good zonal spherical aberration correction, that in Example III which has a low rear air separation being exceptionally good whilst in Example II, which has a high index front component and a low front air separation, the improvement in zonal spherical aberration correction is sacrificed in order to obtain a higher aperture.

The sum of the numerical values of the two outermost radii is in Example I 1.0824, in Example II 1.1034 and in Example III .9777.

What I claim as my invention and desire to secure by Letters Patent is:

1. An optical objective corrected for spherical and chromatic aberrations, coma, astigmatism, field curvature and distortion, and comprising two outer collective components and a dispersive component between such collective components, the three components being axially aligned and each consisting of a simple element, the glass used for one of the collective components having a mean refractive index greater than 1.75 whilst at least one of the other two components is made of glass having a mean refractive index less than 1.7, the total axial length of the objective between the front surface of the front component and the rear surface of the rear component lying between .35 and .70 times the equivalent focal length of the objective.

2. An optical objective corrected for spherical and chromatic aberrations, coma, astigmatism, field curvature and distortion, and comprising two outer collective components and a dispersive component between such collective components, the three components being axially aligned and each consisting of a single element, the glass used for one of the collective components having a mean refractive index greater than 1.75 while at least one of the other two components is made of glass having a mean refractive index less than 1.7, the sum of the numerical values of the radii of curvature of the front surface of the front component and of the rear surface of the rear component lying between .85 and 1.3 times the equivalent focal length of the objective.

3. An optical objective corrected for spherical and chromatic aberrations, coma, astigmatism, field curvature and distortion, and comprising two outer collective components and a dispersive component between such collective components, the three components being axially aligned and each consisting of a simple element, the glass used for one of the collective components having a mean refractive index greater than 1.8 whilst at least one of the other two components is made of glass having a mean refractive index less than 1.7, the sum of the numerical values of the radii of curvature of the front surface of the front component and of the rear surface of the rear component lying between .85 and 1.3 times the equivalent focal length of the objective.

4. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the rear collective component having a mean refractive index greater than 1.8 and those for the other two components each having a mean refractive index less than 1.7, the axial air separation between the middle and rear components being less than forty per cent of that between the front and middle components, while the total axial length of the objective between the front surface of the front component and the rear surface of the rear component lies between .35 and .70 times the equivalent focal length of the objective.

5. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the rear collective component having a mean refractive index greater than 1.75 whilst at least one of the other two components is made of glass having a mean refractive index less than 1.7, the sum of the numerical values of the radii of curvature of the front surface of the front component and of the rear surface of the rear component lying between .85 and 1.3 times the equivalent focal length of the objective, the axial air separation between the middle and rear components being less than forty per cent of that between the front and middle components.

6. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the front collective component having a mean refractive index greater than 1.8 and those for the other two components each having a mean refractive index less than 1.7, the axial air separation between the front and middle components being less than fifty per cent of that between the middle and rear components, while the total axial length of the objective between the front surface of the front component and the rear surface of the rear component lies between .35 and .70 times the equivalent focal length of the objective.

7. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the front collective component having a mean refractive index greater than 1.75 whilst at least one of the other two components is made of glass having a mean refractive index less than 1.7, the sum of the numerical values of the radii of curvature of the front surface of the front component and of the rear surface of the rear component lying between .85 and 1.3 times the equivalent focal length of the objective, the axial air separation between the front and middle components being less than fifty per cent of that between the middle and rear components.

8. An optical objective corrected for spherical and chromatic aberrations, coma, astigmatism, field curvature and distortion, and comprising two outer collective components and a middle dispersive component, the three components being axially aligned and each consisting of a simple element, one of the collective components being made of a glass having a mean refractive index greater than 1.75 and being axially separated from the dispersive component by an air space less than one tenth and greater than one fiftieth of the equivalent focal length of the objective, whilst at least one of the other two components is made of glass having a mean refractive index less than 1.7.

9. An objective as claimed in claim 8, in which the sum of the numerical values of the radii of curvature of the front surface of the front component and of the rear surface of the rear component lies between .85 and 1.3 times the equivalent focal length of the objective.

10. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the rear collective component having a mean refractive index greater than 1.8 and those for the other two components each having a mean refractive index less than 1.7, the axial air separation between the middle and rear components being less than forty per cent of that between the front and middle components and being less than one tenth and greater than one fiftieth of the equivalent focal length of the objective.

11. An optical objective corrected for spherical and chromatic aberrations, coma, astigmatism, field curvature and distortion, and comprising two outer collective components and a dispersive component between such collective components, the three components being axially aligned and each consisting of a simple element, the glass used for the front collective component having a mean refractive index greater than 1.8 and those for the other two components each having a mean refractive index less than 1.7, the axial air separation between the front and middle components being less than fifty per cent of that between the middle and rear components and being less than one tenth and greater than one fiftieth of the equivalent focal length of the objective.

12. An optical objective having three axially aligned components each consisting of a simple element and having numerical data substantially as set forth in the following table:

[Equivalent focal length 1.000.   Relative aperture F/2.5]

| Radius | Thickness or separation | Refractive index $n_D$ | Abbe $\nu$ number |
|---|---|---|---|
| $R_1 = +.3460$ | $D_1 = .109$ | 1.574 | 57.5 |
| $R_2 = \infty$ | $S_1 = .110$ | | |
| $R_3 = -.6443$ | $D_2 = .031$ | 1.697 | 30.7 |
| $R_4 = +.3571$ | $S_2 = .110$ | | |
| $R_5 = +1.205$ | $D_3 = .085$ | 1.901 | 42.5 |
| $R_6 = -.7364$ | | | |

13. An optical objective having three axially aligned components each consisting of a simple element and having numerical data substantially as set forth in the following table:

[Equivalent focal length 1.000.   Relative aperture F/2.2]

| Radius | Thickness or separation | Refractive index $n_D$ | Abbe $\nu$ number |
|---|---|---|---|
| $R_1 = +.6761$ | $D_1 = .186$ | 1.901 | 42.5 |
| $R_2 = -1.754$ | $S_1 = .065$ | | |
| $R_3 = -.5435$ | $D_2 = .052$ | 1.697 | 30.7 |
| $R_4 = +.4273$ | $S_2 = .170$ | | |
| $R_5 = +2.222$ | $D_3 = .125$ | 1.613 | 59.3 |
| $R_6 = -.4273$ | | | |

14. An optical objective having three axially aligned components each consisting of a simple element and having numerical data substantially as set forth in the following table:

[Equivalent focal length 1.000.   Relative aperture F/2.7]

| Radius | Thickness or separation | Refractive index $n_D$ | Abbe $\nu$ number |
|---|---|---|---|
| $R_1 = +.5255$ | $D_1 = .065$ | 1.613 | 59.3 |
| $R_2 = +3.559$ | $S_1 = .243$ | | |
| $R_3 = -.4272$ | $D_2 = .017$ | 1.697 | 30.7 |
| $R_4 = +.5051$ | $S_2 = .061$ | | |
| $R_5 = +1.335$ | $D_3 = .087$ | 1.901 | 42.5 |
| $R_6 = -.4522$ | | | |

ARTHUR WARMISHAM.